May 6, 1952  B. S. NELSON  2,595,479
RADIALLY MOVABLE PISTON TYPE CLUTCH
Filed Oct. 9, 1946
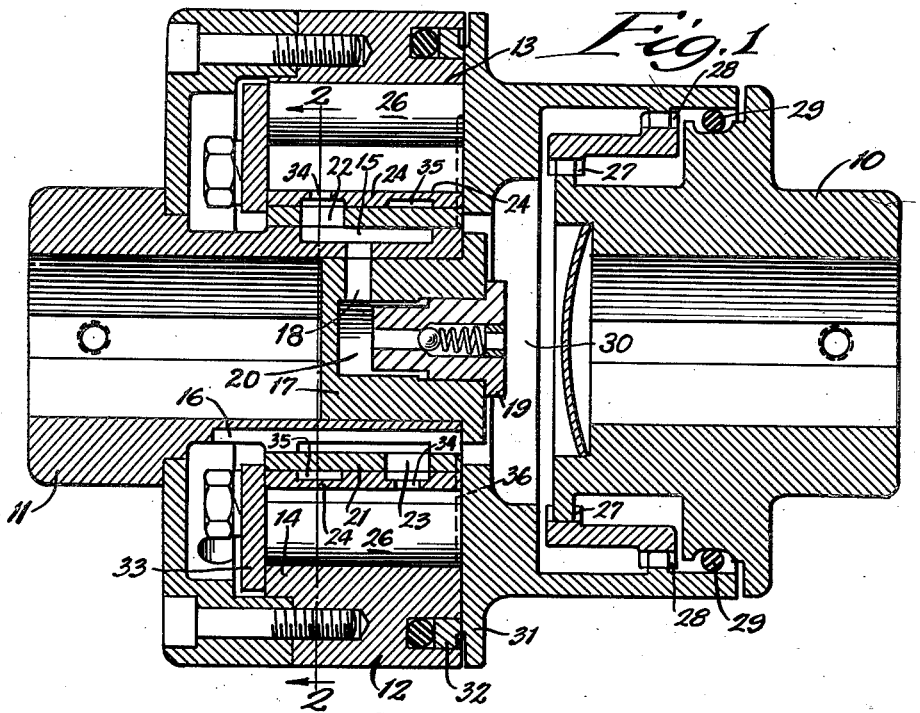
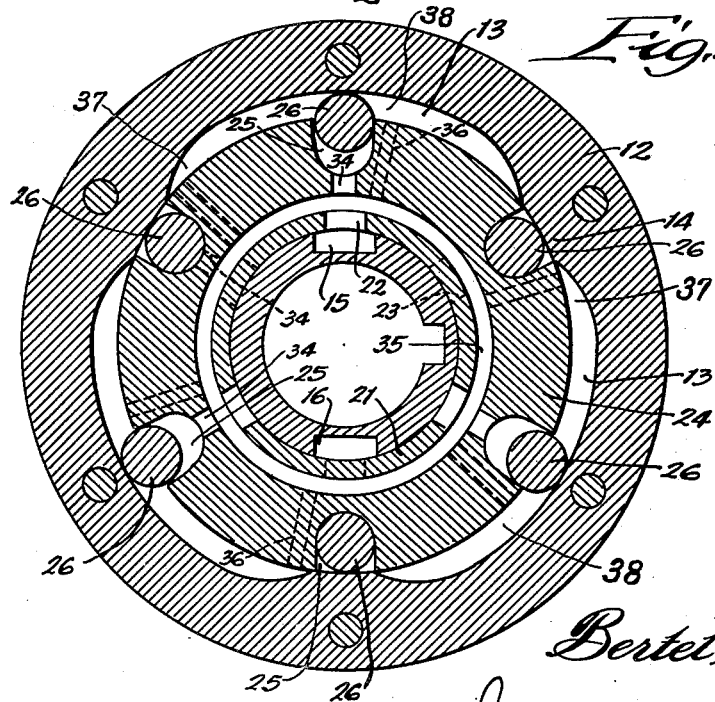
Inventor:
Bertel S. Nelson,
By Dawson, Broth & Spangenberg,
Attorneys.

Patented May 6, 1952

2,595,479

UNITED STATES PATENT OFFICE 2,595,479

RADIALLY MOVABLE PISTON TYPE CLUTCH

Bertel S. Nelson, Chicago, Ill., assignor to Foote Bros. Gear and Machine Corporation, Chicago, Ill., a corporation of Delaware Application October 9, 1946, Serial No. 702,295

6 Claims. (Cl. 192—60)

This invention relates to couplings and more particularly to hydraulic torque transmitting couplings of the fluid displacement type.

One of the objects of the invention is to provide a coupling of the fluid displacement type which produces a smooth continuous transmission of torque.

Another object is to provide a coupling in which the flow of fluid in the coupling is controlled by valve means operated in response to relative rotation of the coupling parts. According to one feature the valve may be of the continuously rotating type serving alternately to connect fluid displacement chambers with a supply source and a high pressure discharge point.

Still another object is to provide a coupling in which a full supply of fluid in the displacement chambers is insured at all times.

The above and other objects and advantages of the invention will be apparent from the following description when read in connection with the accompanying drawing, in which:

Figure 1 is an axial section through a coupling embodying the invention; and

Figure 2 is a transverse section on the line 2—2 of Figure 1.

The coupling is adapted to connect a pair of coaxial shafts, one of which may be keyed or splined to a hub member 10 and the other of which to a similar hub member 11. The hub member 11 has secured thereto an annular casing ring 12 which is formed on its inner surface with a series of circumferential spaced recesses 13 shown as three in number. The recesses are separated by lands 14 which are equidistant from the axis of the casing. The hub member 11 extends axially into the casing to terminate flush with the outer face of the casing ring 12 and is formed with fluid passages 15 and 16. The passage 15 is in the form of a short groove extending for a limited distance axially, as seen in Figure 1, while the passage 16 is a longer groove extending substantially throughout the hub portion. The hub 11 carries a tubular plug 17 forming a high pressure discharge chamber 20 which communicates through a passage 18 with the groove 15. A control valve 19 closes the end of the discharge chamber and may be regulated in response to fluid pressure to control the pressure maintained in the discharge chamber.

The passages 15 and 16 are adapted to produce a valving effect in cooperation with an annular sleeve 21 rotatably mounted on the hub portion and formed with two series of ports 22 and 23. As shown, there are three ports 22 and three ports 23 which are spaced axially from the ports 22 and are staggered circumferentially with respect thereto.

The casing is adapted to receive a cylindrical rotor 24 which is connected to the sleeve 21 and whose outer surface sealingly engages the lands 14. The rotor is formed with a series of radially extending pockets 25 equal in number to an integral multiple of the number of recesses. In the form shown there are three recesses and six pockets although more pockets could be utilized if desired. Each of the pockets slidably carries a gate member shown as a roller 26 which can move radially in the pockets to maintain contact with the inner surface of the casing ring 12 at all times. The rotor is connected to the hub 10 through clutch teeth 27 and 28 and seals against the hub 10 through a flexible seal 29 so that its interior forms a common fluid supply chamber 30 with the interior of the casing. The clutch teeth 27 and 28 provide for slight misalignment of the shafts without interferring with torque transmission and may be omitted where provision for misalignment is not necessary. The rotor is sealed against the end of the casing ring 12 through a flange portion 31 on the rotor engaging a sealing ring 32 to prevent the escape of liquid between the casing and rotor. The opposite end of the rotor carries a sealing ring 33 which seals the ends of the pockets 25 and of the rollers 26.

Each of the pockets connects with a radially extending port 34, and the ports on adjacent pockets are axially staggered so that one port will register with the valve ports 22 and the other with the valve ports 23. In this way as the rotor turns relative to the casing each pocket is alternately connected through its port 22 or 23 and groove 16 to the supply chamber and through the groove 15 and passage 18 to the pressure chamber. To equalize the action of the several gate members all of the ports 34 lying in the same plane are connected by an annular groove 35. The rotor is further formed with radially extending passages 36 connecting the supply chamber to the space immediately trailing each of the gate members.

In operation the casing is filled with any suitable liquid such as oil so that the several passages and chambers throughout the casing will be filled. As the rotor turns relative to the casing, the gate members separate the recesses into high pressure chambers 37 leading the gate members and low pressure chambers 38 trailing the gate members.

As shown in Figure 2, the rotor is adapted to turn counterclockwise so that the low pressure chambers 38 which expand in volume during rotation will be maintained full of liquid through the passages 36. The rollers 26 fit somewhat loosely in the pockets 25 so that high pressure fluid from the high pressure chambers 37 may find its way into the pockets to urge the rollers outward into tight sealing engagement with the interior of the casing. As the rotor turns it will reach the position shown in Figure 2 in which the ports 22 communicate through the groove 15 with the high pressure chamber. In this position the pressures in the several high pressure chambers 37 will be equalized through the annular passage 35, and they will all be in communication with the high pressure chamber 20 so that the high pressures therein will be subject to control by the valve 19. At the same time the ports 23 are in communication with the supply chamber 30 through the groove 16. As the rotor turns, the rollers in the last named pockets will move outward into the recesses, and the pockets will be supplied with fluid from the supply chamber 30 through the groove 16 so that the pockets will be filled. This communication will be maintained until the rollers have moved outward to their maximum extent in the pockets at which time the ports 23 communicating with such pockets will be closed due to turning of the valve 21. As the rotor turns still further the leading rollers in each pocket will reach the ends of the pockets and will be moved inward toward the lands. At this time communication is established between the ports 22 and the groove 16 to connect the pockets of such rollers to the low pressure or supply chamber. Therefore, the liquid in the pockets can flow into the supply chamber as the rollers move inward to prevent blocking movement of the rollers. As rotation continues, the valve action will continue in a manner similar to a commutator alternately to connect the pockets to the high pressure and supply chambers. It will be noted that because there are more rollers than recesses and because the numbers of rollers and recesses are integrally related there will always be one roller effective in each of the recesses so that a continuous smooth torque transmission is produced.

During normal low torque operation the valve 19 will remain closed so that fluid is trapped in the high pressure chambers and the pockets. Any tendency of the rotor and casing to turn relative to each other tends to force this trapped fluid past the valve 19 but under normal torque conditions the valve 19 remains closed. Therefore, except for the very minor slip permitted by leakage around the rollers the rotor and casing are locked together at this time to transmit torque directly between the shafts. On excess load the valve 19 will open in response to the increased pressure in the high pressure chambers and the pockets so that liquid from the pockets can flow past it to permit relative rotation of the casing and rotor. It will be noted in this connection that the port sizes are such that the high pressure chambers are connected to the valve chamber during all of the time that they are under high pressure.

While one embodiment of the invention has been shown and described in detail herein, it will be understood that this is illustrative only and is not intended to be taken as a definition of the scope of the invention, reference being had for this purpose to the appended claims.

What is claimed is:

1. A coupling comprising a hollow casing having a tubular wall section formed on its inner surface with a series of circumferentially spaced recesses, a rotor of circular section fitting into the casing, the rotor being formed with a series of radially extending pockets, gate members slidably mounted in the pockets to engage the inner surface of the casing, the casing forming a liquid supply chamber and the rotor being formed with a liquid pressure chamber, valve means operated by rotation of the rotor in the casing alternately to connect the pockets to the supply chamber and the discharge chamber and a valve connecting the pressure chamber to the supply chamber to control the pressure in the pressure chamber.

2. A coupling comprising a hollow casing having a tubular wall section formed on its inner surface with a series of circumferentially spaced recesses, a rotor of circular section fitting into the casing, the rotor being formed with a series of radially extending pockets, gate members slidably mounted in the pockets to engage the inner surface of the casing, the gate members fitting loosely in the pockets so that fluid from the forward side of the gate members can flow therepast into the pockets, the casing forming a fluid supply chamber and the rotor being formed with a fluid pressure chamber, and valve means controlled by rotation of the rotor in the casing alternately to connect the pockets to the supply chamber and the pressure chamber.

3. A coupling comprising a hollow casing having a tubular wall section formed on its inner surface with a series of circumferentially spaced recesses, a rotor of circular section fitting into the casing, the rotor being formed with a series of radially extending pockets, gate members slidably mounted in the pockets to engage the inner surface of the casing, the gate members fitting loosely in the pockets so that fluid from the forward side of the gate members can flow therepast into the pockets, the casing forming a fluid supply chamber and the rotor being formed with a fluid pressure chamber, the rotor being formed with inwardly extending ports communicating with the pockets, and a valve part in the rotor formed with passages alternately to connect the ports to the supply chamber and the pressure chamber as the rotor turns.

4. A coupling comprising a hollow casing having a tubular wall section formed on its inner surface with a series of circumferentially spaced recesses, a rotor of circular section fitting into the casing, the rotor being formed with a series of radially extending pockets, gate members slidably mounted in the pockets to engage the inner surface of the casing, the gate members fitting loosely in the pockets so that fluid from the forward side of the gate members can flow therepast into the pockets, the casing forming a fluid supply chamber and the rotor being formed with a fluid pressure chamber, the rotor being formed with inwardly extending ports communicating with the pockets, and a valve part in the rotor formed with passages alternately to connect the ports to the supply chamber and the pressure chamber as the rotor turns, the rotor further being formed with passages connecting the supply chamber to the spaces trailing the gate members.

5. A coupling comprising a hollow casing formed on its inner surface with a series of circumferentially spaced recesses, a cylindrical hub extending axially into the casing and secured against rotation relative thereto and formed with a high pressure fluid chamber, the hub being formed with spaced passages communicating with the high pressure chamber and with the interior of the casing respectively, a rotor in the casing rotatable on the hub and formed with a series of spaced radial pockets of the same length as the width of the recesses, means closing the ends of the recesses and pockets, and gate members slidable in the pockets to engage the inner casing surface and divide the recesses into circumferentially spaced high and low pressure chambers, the rotor being formed with ports extending to the hub alternately to connect the pockets with the passages in the hub.

6. A coupling comprising a hollow casing formed on its inner surface with a series of circumferentially spaced recesses, a cylindrical hub extending axially into the casing and secured against rotation relative thereto and formed with a high pressure fluid chamber, the hub being formed with spaced passages communicating with the high pressure chamber and with the interior of the casing respectively, a rotor in the casing rotatable on the hub and formed with a series of spaced radial pockets of the same length as the width of the recesses, means closing the ends of the recesses and pockets, and gate members slidable in the pockets to engage the inner casing surface and divide the recesses into circumferentially spaced high and low pressure chambers, the rotor being formed with ports extending to the hub alternately to connect the pockets with the passages in the hub, and with passages connecting the interior of the hub to the spaces immediately trailing the gate members.

BERTEL S. NELSON.

REFERENCES CITED

The following references are of record in the file of this patent:

UNITED STATES PATENTS

| Number | Name | Date |
| --- | --- | --- |
| 1,514,804 | Staude | Nov. 11, 1924 |
| 1,559,462 | Ryan | Oct. 27, 1925 |
| 1,567,912 | Carey | Dec. 29, 1925 |
| 1,749,121 | Barlow | Mar. 4, 1930 |
| 1,823,389 | DeLavaud | Sept. 15, 1931 |
| 2,146,717 | Berger | Feb. 14, 1939 |
| 2,242,734 | Whittlesey | May 20, 1941 |
| 2,380,445 | Johnson et al. | July 31, 1945 |
| 2,511,518 | Stephens | June 13, 1950 |